United States Patent [19]

Braun et al.

[11] 4,242,098
[45] Dec. 30, 1980

[54] TRANSPORT OF AQUEOUS COAL SLURRIES

[75] Inventors: David B. Braun, Ridgefield, Conn.; Stephen Drap, Pawling; Henry E. Fritz, Ossining, both of N.Y.; Arthur K. Ingberman, Bridgewater, N.J.

[73] Assignee: Union Carbide Corporation, New York, N.Y.

[21] Appl. No.: 921,807

[22] Filed: Jul. 3, 1978

[51] Int. Cl.$^3$ .............................................. C10L 1/32
[52] U.S. Cl. ........................................ 44/51; 44/77; 44/72; 44/62; 406/197; 137/13
[58] Field of Search .................... 44/51, 62, 55, 70, 72, 44/77; 302/66; 137/13; 252/311; 406/197

[56] References Cited
U.S. PATENT DOCUMENTS

| | | | |
|---|---|---|---|
| 3,524,682 | 8/1970 | Booth | 302/66 |
| 3,996,026 | 12/1976 | Cole | 44/51 |
| 4,090,853 | 5/1978 | Clayfield et al. | 44/51 |

OTHER PUBLICATIONS

Ceramics Bulletin, 56, 11, p. 1031 (1977).

*Primary Examiner*—Jacqueline V. Howard
*Attorney, Agent, or Firm*—Gary L. Wamer

[57] ABSTRACT

Compositions containing small amounts of named water soluble polymers in an aqueous coal slurry permit the extrusion, pumping and transport of higher solids content aqueous coal slurries.

13 Claims, No Drawings

TRANSPORT OF AQUEOUS COAL SLURRIES

BACKGROUND OF THE INVENTION

Coal is a major source of energy in the United States and is increasing in importance because of the abundance within the United States and because of the security and balance of payments problems which arise from our reliance on foreign oil. A very promising process is the gasification of coal to produce gas for pollution free combustion and as a petrochemical feedstock but this requires the need to pump large quantities of coal into the reactor.

Transport problems constitute one of the major difficulties in the use of coal. Aqueous slurries of finely ground coal containing more than about 55 weight percent solids are difficult to transport using conventional slurry pumps because as the solids level is increased above about 50 weight percent the water and solids tend to separate causing coal particles to build up in various areas throughout the pumping system. This dewatering of the slurry causes blockage and jamming of the pumping system. For similar reasons coal slurries containing above about 65 weight percent solids have not heretofore been capable of being extruded continuously using an extruder.

It is desirable to decrease the weight percent of water in aqueous coal slurries because water is a major contributor to the cost of transport and processing operations. The less water transported the greater is the volume of coal that can be moved, resulting in transport efficiencies. Also during coal gasification a significant amount of heat is required to vaporize the water vehicle. As the weight percent of the water vehicle decreases, the efficiency of the coal gasification process increases. A method which allows the use of higher weight percent solids aqueous coal slurries than were heretofore feasible would be of great importance.

SUMMARY OF THE INVENTION

It has now been found that small amounts of certain water-soluble polymers when added to aqueous coal slurries permit the transport of coal slurries with much higher weight percent solids content than were heretofore possible.

DESCRIPTION OF THE INVENTION

This invention relates to an improved aqueous coal slurry composition which can be more readily transported; the composition can contain a much higher weight percent of coal than has heretofore been present in pumpable or extrudable coal slurries. The invention comprises the addition of small amounts of certain water-soluble polymers to an aqueous coal slurry. This allows the continuous transport of a coal slurry of higher weight percent before dewatering occurs.

Illustrative of the water-soluble polymers suitable for use in this invention are poly(ethylene oxide), partially hydrolyzed poly(acrylamide), hydroxyethyl cellulose, the quaternary nitrogen-substituted cellulose ethers as defined by Union Carbide as "Polymer JR" in U.S. Pat. No. 4,018,729, xanthan gum, hydroxypropyl guar gum and carboxymethyl hydroxypropyl guar gum.

The intrinsic viscosity of the poly(ethylene oxide) can vary from 1 to 50 dl/gm, preferably from 1 to 25 dl/gm, measured in water at 30° C. The intrinsic viscosity of the hydroxyethyl cellulose can vary from 1 to 10 dl/gm measured in a 3 percent aqueous sodium chloride solution at 25° C. The intrinsic viscosity of the partially hydrolyzed poly(acrylamide), xanthan gum, hydroxypropyl guar gum and carboxymethyl hydroxypropyl guar gum can vary from 10 to 15 dl/gm, or more, measured in a 3 percent aqueous sodium chloride solution at 25° C. The "Polymer JR" can vary in molecular weight from 100,000 to 3,000,000.

The concentration of the water-soluble polymer added, based on the total weight of the coal slurry composition, can be up to 10 weight percent, preferably from 0.05 weight percent to 5.0 weight percent, most preferably from 0.1 weight percent to 2.0 weight percent. At concentrations of greater than 10 weight percent the polymer, which is a thickener for the water, increases the viscosity of the slurry and renders it more difficult to transport.

Aqueous coal slurries containing at least one of the defined water-soluble polymers and a concentration of up to about 78 weight percent coal are easily transported and do not dewater to the extent previously experienced. This is true not only when transport is attempted against atmospheric pressure but also when transport is attempted against an elevated pressure as is often encountered in the operation of a coal gasification unit. The ease of transport of the coal slurries is found to depend upon the concentration and type of coal and the concentration and the type of water-soluble polymer.

It was unexpected and unobvious to find that small amounts of the herein defined water-soluble polymers would facilitate the transport of high weight percent solids content coal slurries and thus result in the capability of transporting much higher weight percent solids coal slurries than were heretofore possible. This was accomplished without the slurry dewatering and without the transport system becoming jammed.

This invention is of great advantage in all operations which require the transport of coal in aqueous slurry form, such as in coal gasification operations where a considerable amount of energy is often uselessly expended to vaporize the water in the slurry.

The following Experiments are presented for comparative purposes.

EXPERIMENT A

West Virginia #5 coal was pulverized such that 70 percent could pass through a 200 mesh screen and therefore be classified as boiler grind. A 67 weight percent coal slurry was prepared by combining 50.0 grams of this boiler grind #5 Block West Virginia coal and 24.6 grams of water in a torque rheometer mixer, which is used to blend high viscosity materials while at the same time measuring the torque required for the mixing, and blending for 15 minutes. A 20 cc syringe measuring 3.07 inches in length and 0.77 inches in diameter and having a 0.20 inch diameter orifice was filled with the slurry and a force was applied to the plunger of the syringe at a constant rate forcing the slurry through the orifice. When the stress force applied to the plunger reached 180 pounds, the volume of the slurry in the syringe was found to be 10 cc. Examination revealed that most of the water had passed through the syringe orifice leaving a relatively dry solid mass of coal in the barrel of the syringe, which mass represented nearly all of the original coal solids content. Thus a 67 weight percent solids aqueous coal slurry could not be transported using this equipment without the water-soluble polymer present.

EXPERIMENT B

A 67 weight percent solids aqueous coal slurry was prepared by combining 10.5 pounds of boiler grind #5 Block West Virginia coal with 5.17 pounds of water in a muller and mixing for 10 minutes. The slurry was then fed to a laboratory auger extruder where extrusion was attempted. After 5 minutes the extruder stalled and inspection of the auger showed that a relatively dry, very hard mass of coal had collected at the die causing the tips of the auger flights to break off. Thus, a 67 weight percent solids aqueous coal slurry could not be transported using this extruder in the absence of the defined water-soluble polymer.

EXPERIMENT C

Three types of coals, West Virginia #5, Illinois #6, and West Virginia-Pittsburg Vein, were pulverized so as to be classified as boiler grind. The water content of the coals as measured by the Karl Fischer Method was 1.0 percent for West Virginia #5, 5.5 percent for Illinois #6, and 2.0 percent for West Virginia-Pittsburg Vein. Twelve aqueous coal slurries varying in either type or weight percent of coal were prepared by combining the coal with added water in the torque rheometer mixer and mixing for 15 minutes. The original water in the coal was considered as free water in the slurries. A 23.4 cc sample of each slurry was transferred to a stainless steel syringe of similar dimensions to the syringe used in Experiment A. The syringe was attached to a stainless steel pressure vessel equipped with a 500 psig relief valve so that the coal slurry could be extruded into the pressure vessel. The entire apparatus was mounted on an stress-strain machine and the vessel was then pressurized with nitrogen gas to 500 psig. The plunger of the syringe rested on a compressive force measuring device so that the force required to push the plunger into the syringe and thereby extrude the coal into the pressurized vessel could be accurately measured. The force measuring device was attached to an X-Y recorder which continuously recorded the distance travelled by the plunger and the force required. Since the inside diameter of the syringe was accurately known, the distance travelled by the plunger was easily converted to the volume of coal slurry extruded. The force was applied by moving the cross arm of the testing machine downward at the rate of 2 inches/minute. Most tests were halted when the plunger travelled 3 inches or the force required to move the plunger reached 4000 pounds. In a few tests a force exceeding 4000 pounds was applied. Five measurements were recorded:
1. F—The relatively constant force required to extrude the slurry before dewatering occurred.
2. $V_d$—The volume of slurry extruded when dewatering occurred and the force required increased sharply by a factor of 2 or more.
3. $V_{4000}$—The volume of slurry extruded when the force required reached 4000 lbs.
4. $V_{max}$—The maximum volume of slurry extruded. The extrusion of 22.8 cc of slurry indicates that no dewatering occurred. Although 23.4 cc of slurry were originally charged to the syringe, 0.6 cc could not be extruded because of hold-up in the tip of the syringe.
5. $F_{max}$—The force required for the extrusion of the maximum volume.

The results of this experiment are shown in Table I.

TABLE I

| Coal Type | Wt. % | F (lbs) | $V_d$ (cc) | $V_{4000}$ (cc) | $V_{max}$ (cc) | $F_{max}$ (lbs) |
|---|---|---|---|---|---|---|
| W.V. #5 | 55 | 250 | 20.6 | — | 22.8 | 450 |
| W.V. #5 | 60 | 250 | 15.2 | — | 22.8 | 3600 |
| W.V. #5 | 67 | 260 | 9.8 | 19.4 | 19.4 | 4000 |
| W.V. #5 | 70 | 300 | 7.6 | 17.4 | 17.4 | 4000 |
| Ill. #6 | 55 | 250 | 17.4 | — | 22.8 | 1650 |
| Ill. #6 | 60 | 250 | 13.0 | — | 22.4 | 4000 |
| Ill. #6 | 68 | 350 | 9.8 | 18.9 | 18.9 | 4000 |
| Ill. #6 | 70 | 500 | 9.2 | 18.6 | 19.8 | 4500 |
| W.V.-Pitt. | 55 | 260 | — | — | 22.8 | 260 |
| W.V.-Pitt. | 60 | 350 | 17.4 | — | 22.8 | 2000 |
| W.V.-Pitt. | 65 | — | 13.0 | 20.2 | 20.6 | 4600 |
| W.V.-Pitt. | 67 | — | 13.0 | 20.6 | 20.6 | 4000 |

This Experiment shows that the maximum concentration of coal in the slurry which can be transported with this equipment without the water-soluble polymer present is about 55 weight percent coal.

The following examples serve to further illustrate the invention.

EXAMPLE 1

A 67 weight percent coal slurry was prepared in a manner similar to that of Experiment A using the the same batch size except that 0.25 weight percent poly(ethylene oxide) having an average molecular weight of about 4,000,000 and intrinsic viscosity in water of about 12 dl/gm at 30° C. was added before mixing. Extrusion by procedures similar to those described in Experiment A left 3.3 cc of slurry in the syringe. This example shows that about 83 percent of the coal slurry could now be transported as compared to nearly none transported in Experiment A.

EXAMPLE 2

A 67 weight percent coal slurry was prepared in a manner similar to that of Experiment A using the same batch size except that 0.29 weight percent of poly(ethylene oxide) having an average molecular weight of about 4,000,000 and intrinsic viscosity in water of about 12 dl/gm at 30° C. was added before mixing. Extrusion by procedures similar to those described in Experiment A left 3.0 cc of slurry in the syringe. This example shows that about 85 percent of the coal slurry could now be transported as compared to nearly none transported in Experiment A.

EXAMPLE 3

A 67 weight percent coal slurry was prepared in a manner similar to that of Experiment A using the same batch size except that 0.40 weight percent of poly(ethylene oxide) having an average molecular weight of about 4,000,000 and intrinsic viscosity in water of about 12 dl/gm at 30° C. was added before mixing. Extrusion by procedures similar to those described in Experiment A left no slurry in the syringe. This example shows that all of the coal slurry could now be transported as compared to nearly none transported in Experiment A so that the slurry could be continuously extruded.

EXAMPLE 4

A 67 weight percent coal slurry was prepared in a manner similar to that of Experiment A using the same batch size except that 0.49 weight percent of poly(ethylene oxide) having an average molecular weight of about 4,000,000 and intrinsic viscosity in water of about 12 dl/gm at 30° C. was added before mixing. Extrusion by procedures similar to those described in Experiment A left no slurry in the syringe. This example shows that all of the coal slurry could now be transported as compared to nearly none transported in Experiment A so that the slurry could be continuously extruded.

EXAMPLE 5

A 67 weight percent coal slurry was prepared in a manner similar to that of Experiment B using the same batch size except that 0.40 weight percent of poly(ethylene oxide) having an average molecular weight of about 4,000,000 and an intrinsic viscosity in water of about 12 dl/gm at 30° C. was added before mixing. In an extrusion by procedures similar to those described in Experiment B, all the slurry was extruded and inspection of the extrudate revealed no evidence that dewatering had occurred in the extruder. This example shows that the invention is effective on a larger scale as well as a small scale.

EXAMPLE 6

A 70 weight percent coal slurry was prepared in a manner similar to that of Experiment B using the same batch size except that 0.50 weight percent of poly(ethylene oxide) having an average molecular weight of about 4,000,000 and intrinsic viscosity in water of about 12 dl/gm at 30° C. was added before mixing. In an extrusion by procedure similar to those described in Experiment B, all the slurry was extruded and inspection of the extrudate revealed no evidence that dewatering had occurred in the extruder.

EXAMPLE 7

Twenty-three coal slurries, each containing 78 weight percent West Virgina #5 boiler grind coal were prepared in a manner similar to that of Experiment C using the same batch size except that to each slurry the type and weight percent of the water-soluble polymer added to each slurry were varied. The types of polymers were as follows:

Type A—Poly(ethylene oxide) with an intrinsic viscosity in water of about 12 dl/gm at 30° C. and a 1 weight percent aqueous solution viscosity of 1650–3850 cps at 25° C.

Type E—Poly(ethylene oxide) with an intrinsic viscosity in water of about 4 dl/gm at 30° C. and a 5 weight percent aqueous solution viscosity of 4500–8800 cps at 25° C.

Type C—Poly(ethylene oxide) with an intrinsic viscosity in water of about 1 dl/gm at 30° C. and a 5 weight percent aqueous solution viscosity of 12–38 cps at 25° C.

Type D—Quaternary nitrogen containing cellulose ether as defined in U.S. Pat. No. 4,018,729 with an intrinsic viscosity in 3 percent aqueous sodium chloride solution of about 11 dl/gm at 25° C. and a 1 weight percent aqueous solution viscosity of 1000–2500 cps at 25° C.

Type E—Hydroxyethyl cellulose with an intrinsic viscosity in 3 percent aqueous sodium chloride solution of about 8 dl/gm at 25° C. and 1 weight percent aqueous solution viscosity of 2400–3000 cps at 25° C.

Type F—Hydroxyethyl cellulose with an intrinsic viscosity in 3 percent aqueous sodium chloride solution of about 6 dl/gm at 25° C. and a 1 weight percent aqueous solution viscosity of 1500–1900 cps at 25° C.

Type G—Hydroxyethyl cellulose with an intrinsic viscosity in 3 percent aqueous sodium chloride solution of about 5 dl/gm at 25° C. and a 1 weight percent aqueous solution viscosity of 1100–1450 cps at 25° C.

Type H—Partially hydrolyzed poly(acrylamide) with an intrinsic viscosity in 3 percent aqueous sodium chloride solution of about 15 dl/gm at 25° C.

Type I—Partially hydrolyzed poly(acrylamide) with an intrinsic viscosity in 3 percent aqueous sodium chloride solution of about 14 dl/gm at 25° C.

Type J—Xanthan gum with an intrinsic viscosity in 3 percent aqueous sodium chloride solution of about 11 dl/gm at 25° C. and a 1 weight percent aqueous solution viscosity of 850 cps at 25° C.

Type K—Carboxymethyl hydroxypropyl guar gum with an intrinsic viscosity in 3 percent aqueous sodium chloride solution of about 13 dl/gm at 25° C. and a 1 weight percent aqueous solution viscosity of 4500 cps at 25° C.

Type L—Hydroxypropyl guar gum with an intrinsic viscosity in 3 percent aqueous sodium chloride solution of about 12 dl/gm at 25° C. and a 1 weight percent aqueous solution viscosity of 3300 cps at 25° C.

Extrusion tests similar to those in Experiment C were carried out and the results are shown in Table II.

TABLE II

| Additive | | F | $V_d$ | $V_{4000}$ | $V_{max}$ | $F_{max}$ |
| --- | --- | --- | --- | --- | --- | --- |
| Type | Wt. % | (lbs) | (cc) | (cc) | (cc) | (lbs) |
| A | 0.3 | — | 1.6 | 14.0 | 14.0 | 4000 |
| A | 0.5 | — | 1.9 | 14.4 | 14.4 | 4000 |
| A | 0.7 | 800 | 14.0 | 21.2 | 21.2 | 4000 |
| A | 0.85 | 900 | 15.6 | 21.6 | 21.6 | 4000 |
| A | 1.0 | 650 | — | — | 22.8 | 650 |
| B | 0.7 | — | 1.6 | 18.6 | 18.6 | 4000 |
| B | 1.0 | 950 | 3.0 | — | 22.8 | 950 |
| C | 0.7 | — | 2.2 | 15.6 | 15.6 | 4000 |
| C | 1.0 | 1000 | 11.4 | — | 22.8 | 3200 |
| D | 0.75 | 600 | — | — | 22.8 | 600 |
| D | 1.0 | 400 | — | — | 22.8 | 400 |
| E | 0.5 | — | 1.6 | 14.4 | 14.8 | 4000 |
| E | 0.75 | 1000 | 19.0 | — | 22.8 | 3500 |
| E | 1.0 | 450 | — | — | 22.8 | 450 |
| F | 1.0 | 500 | — | — | 22.8 | 500 |
| G | 1.0 | 500 | — | — | 22.8 | 500 |
| H | 0.75 | 700 | — | — | 22.8 | 700 |
| H | 1.0 | 650 | — | — | 22.8 | 650 |
| I | 0.75 | 650 | — | — | 22.8 | 650 |
| I | 1.0 | 500 | — | — | 22.8 | 500 |
| J | 1.0 | 650 | — | — | 22.8 | 650 |
| K | 1.0 | 700 | — | — | 22.8 | 700 |
| L | 1.0 | 600 | — | — | 22.8 | 600 |

This example shows that a variety of water-soluble polymers in concentrations of 1.0 weight percent or less, when added to a 78 weight percent West Virginia #5 coal slurry, are effective in permitting the continuous extrusion of the coal slurry under conditions where a slurry containing similar or smaller concentrations of such coal could not be extruded continuously.

EXAMPLE 8

Six coal slurries, each containing 71.6 weight percent Illinois #6, were prepared in a manner similar to that of Experiment C using the same batch size except that to each slurry the type and weight percent of the water-soluble polymer added, as defined in Example 7, was varied. Extrusion tests similar to those in Experiment C were carried out and the results are shown in Table III.

TABLE III

| Additive | | F | $V_d$ | $V_{4000}$ | $V_{max}$ | $F_{max}$ |
|---|---|---|---|---|---|---|
| Type | Wt. % | (lbs) | (cc) | (cc) | (cc) | (lbs) |
| A | 0.5 | — | — | 18.2 | 18.2 | 4000 |
| A | 0.77 | — | 12.8 | 19.8 | 19.8 | 4000 |
| A | 1.0 | 600 | 16.8 | 21.6 | 21.6 | 4000 |
| A | 1.2 | 400 | 19.0 | — | 22.8 | 2000 |
| A | 1.5 | 350 | 18.2 | — | 22.6 | 4000 |
| I | 0.5 | 700 | 15.2 | 22.6 | 22.0 | 4000 |

This example shows that certain water-soluble polymers in concentrations of 1.5 weight percent or less, when added to a 71.6 weight percent Illinois #6 coal slurry, are effective in permitting the continuous extrusion of the coal slurry under conditions where a slurry containing similar or smaller concentrations of such coal could not be extruded continuously.

EXAMPLE 9

Fourteen coal slurries, each containing 76.5 weight percent Illinois #6, were prepared in a manner similar to that of Experiment C using the same batch size except that to each slurry the type and weight percent of the water-soluble polymer added, as defined in Example 7, was varied. Extrusion tests similar to those in Experiment C were carried out and the results are shown in Table IV.

TABLE IV

| Additive | | F | $V_d$ | $V_{4000}$ | $V_{max}$ | $F_{max}$ |
|---|---|---|---|---|---|---|
| Type | Wt. % | (lbs) | (cc) | (cc) | (cc) | (lbs) |
| A | 0.3 | — | 7.6 | 17.4 | 17.4 | 4000 |
| A | 0.5 | — | 7.6 | 15.9 | 15.9 | 4000 |
| A | 0.7 | — | 15.2 | 22.0 | 22.0 | 4000 |
| A | 1.0 | — | 11.4 | 19.0 | 19.0 | 4000 |
| A | 1.2 | 400 | 20.6 | — | 22.8 | 2000 |
| B | 0.7 | — | 8.4 | 19.0 | 19.0 | 4000 |
| B | 1.0 | — | 12.2 | 21.2 | 21.2 | 4000 |
| B | 1.2 | — | 11.4 | 18.2 | 18.2 | 4000 |
| B | 1.5 | — | 14.4 | 21.2 | 21.2 | 4000 |
| C | 0.7 | — | 7.6 | 15.2 | 15.2 | 4000 |
| C | 1.0 | — | 13.0 | 18.2 | 18.2 | 4000 |
| C | 1.2 | — | 13.0 | 19.8 | 19.8 | 4000 |
| C | 1.5 | — | 15.2 | 22.0 | 22.0 | 4000 |
| D | 1.2 | 300 | — | — | 22.8 | 300 |

This example shows that certain water-soluble polymers in concentrations of 1.5 weight percent or less, when added to a 76.5 weight percent Illinois #6 coal slurry, are effective in permitting the continuous extrusion of the coal slurry under conditions where a slurry containing similar or smaller concentrations of such coal could not be extruded continuously.

EXAMPLE 10

Six coal slurries, each containing 0.5 weight percent water-soluble polymer of Type A as defined in Example 7 were prepared. The coal slurries were composed of boiler grind West Virginia-Pittsburg Vein coal and the concentration of coal was varied in the slurries. Extrusion tests similar to those in Experiment C were carried out and the results are shown in Table V.

TABLE V

| Wt. % Coal | F (lbs) | $V_d$ (cc) | $V_{4000}$ (cc) | $V_{max}$ (cc) | $F_{max}$ (lbs) |
|---|---|---|---|---|---|
| 55.0 | 250 | — | — | 22.8 | 290 |
| 55.0 | 270 | — | — | 22.8 | 290 |
| 60.0 | 280 | 19.8 | — | 22.8 | 720 |
| 65.0 | 350 | 15.2 | 22.8 | 22.8 | 4000 |
| 67.0 | 450 | 11.4 | 22.0 | 22.0 | 4000 |
| 68.0 | 350 | 9.4 | 22.0 | 22.0 | 4000 |

This example shows that 0.5 weight percent of Type A polymer, as defined in Example 7, when added to slurries of West Virginia-Pittsburg Vein coal in concentrations of up to 68 weight percent greatly improves the extrudability of such slurries as compared to the extrudability of similar slurries which contain no polymer.

What is claimed is:

1. In an aqueous coal slurry composition comprising water and coal, the improvement of having present therein up to about 10 weight percent based on the total weight of the composition of a water-soluble polymer from the group consisting of hydroxyethyl cellulose, the quaternary nitrogen-substituted cellulose ethers, xanthan gum, hydroxypropyl guar gum and carboxymethyl hydroxypropyl guar gum.

2. A composition as claimed in claim 1 wherein the said water-soluble polymer is hydroxyethyl cellulose having an intrinsic viscosity in 3 percent aqueous sodium chloride solution at 25° C. of from 1 to 10 dl/gm.

3. A composition as claimed in claim 1 wherein said water-soluble polymer is xanthan gum having an intrinsic viscosity in 3 percent aqueous sodium chloride solution at 25° C. of from 10 to 15 dl/gm.

4. A composition as claimed in claim 1 wherein the said water-soluble polymer is hydroxypropyl guar gum having an intrinsic viscosity in 3 percent aqueous sodium chloride solution at 25° C. of from 10 to 15 dl/gm.

5. A composition as claimed in claim 1 wherein the said water-soluble polymer is carboxymethyl hydroxypropyl guar gum having an intrinsic viscosity in 3 percent aqueous sodium chloride solution at 25° C. of from 10 to 15 dl/gm.

6. A composition as claimed in claim 1 wherein the said water-soluble polymer is a quaternary nitrogen-substituted cellulose ether having a molecular weight from 100,000 to 3,000,000.

7. In a method for transporting or pumping an aqueous coal slurry, the improvement of having present in the aqueous coal slurry a water-soluble polymer from the group consisting of hydroxyethyl cellulose, the quaternary nitrogen-substituted cellulose ethers, xanthan gum, hydroxypropyl guar gum and carboxymethyl hydroxypropyl guar gum in a concentration of up to 10 weight percent based on the total weight of the composition.

8. In an aqueous coal slurry composition consisting essentially of water and coal, the improvement of having present therein up to about 10 weight percent based on the total weight of the water and coal composition of a water-soluble poly(ethylene oxide) polymer.

9. In a method for transporting or pumping an aqueous coal slurry, the improvement of having present in the aqueous coal slurry a water-soluble poly(ethylene oxide) polymer in a concentration of up to 10 weight percent based on the total weight of the composition; said water-soluble polymer reducing the dewatering of the aqueous coal slurry composition.

10. The coal slurry composition of claim 8 wherein coal is present in a concentration of over 50 weight percent based on the total weight of the composition.

11. The method of claim 9 wherein coal is present in a concentration of over 50 weight percent based on the total weight of the composition.

12. A composition as claimed in claim 8 wherein the concentration of said water-soluble polymer is from 0.05 weight percent to 5.0 weight percent.

13. A composition as claimed in claim 8 wherein the said water-soluble polymer is poly(ethylene oxide) having an intrinsic viscosity in water at 30° C. of from 1 to 50 dl/gm and an average molecular weight of from 100,000 to 10,000,000.

* * * * *

UNITED STATES PATENT AND TRADEMARK OFFICE
CERTIFICATE OF CORRECTION

PATENT NO. : 4,242,098
DATED : December 30, 1980
INVENTOR(S) : David B. Braun, Stephen Drap, Henry E. Fritz et al.

It is certified that error appears in the above—identified patent and that said Letters Patent is hereby corrected as shown below:

Col. 3, lines 53, 55, 58, 60, 66 - "F", "V", "V", "V" and "F" should be underscored.

Col. 5, Line 28 - "procedure" should read --procedures--.

Signed and Sealed this

Twentieth Day of October 1981

[SEAL]

Attest:

GERALD J. MOSSINGHOFF

Attesting Officer    Commissioner of Patents and Trademarks